United States Patent [19]
Campau

[11] Patent Number: 5,788,460
[45] Date of Patent: Aug. 4, 1998

[54] METHOD AND APPARATUS FOR PATTERNING CONCRETE BLOCKS AND PRODUCTS

[75] Inventor: John A. Campau, Holland, Mich.

[73] Assignee: Lithibar Matik, Inc., Holland, Mich.

[21] Appl. No.: 829,848

[22] Filed: Apr. 1, 1997

[51] Int. Cl.⁶ ................................................. B65G 57/22
[52] U.S. Cl. ....................... 414/791.6; 414/792; 414/786
[58] Field of Search ..................... 198/418.5, 419.1, 198/426; 414/791.6, 792, 792.4

[56] References Cited

U.S. PATENT DOCUMENTS

| | | | |
|---|---|---|---|
| 3,243,056 | 3/1966 | Gagnoh et al. | 414/792 |
| 3,442,410 | 5/1969 | Solomonson | |
| 3,799,320 | 3/1974 | Bilt | |
| 4,199,287 | 4/1980 | Salts | |
| 4,205,742 | 6/1980 | Thomas et al. | |
| 4,993,907 | 2/1991 | Clark | 414/795.3 |
| 5,417,562 | 5/1995 | Simon | 425/308 |

*Primary Examiner*—Janice L. Krizek
*Attorney, Agent, or Firm*—Reising, Ethington, Learman & McCulloch PLLC

[57] ABSTRACT

Masonry blocks conveyed in side-facing-side relation toward a cubing station for assembling into multi-tiered stacks are fed to a prepositioning station where the blocks are separated into groups of three and the trailing two blocks in each group are reoriented 90° into a so-called tie pattern with the other block. The two trailing blocks remain in parallel relation and extend lengthwisely in the direction of conveyance. The tie-patterned groupings are fed to a patterning station where they are relatively repositioned as necessary into the arrangement predetermined by the particular tier pattern being assembled. Once properly oriented, the block groups are transferred to the cubing station.

24 Claims, 8 Drawing Sheets

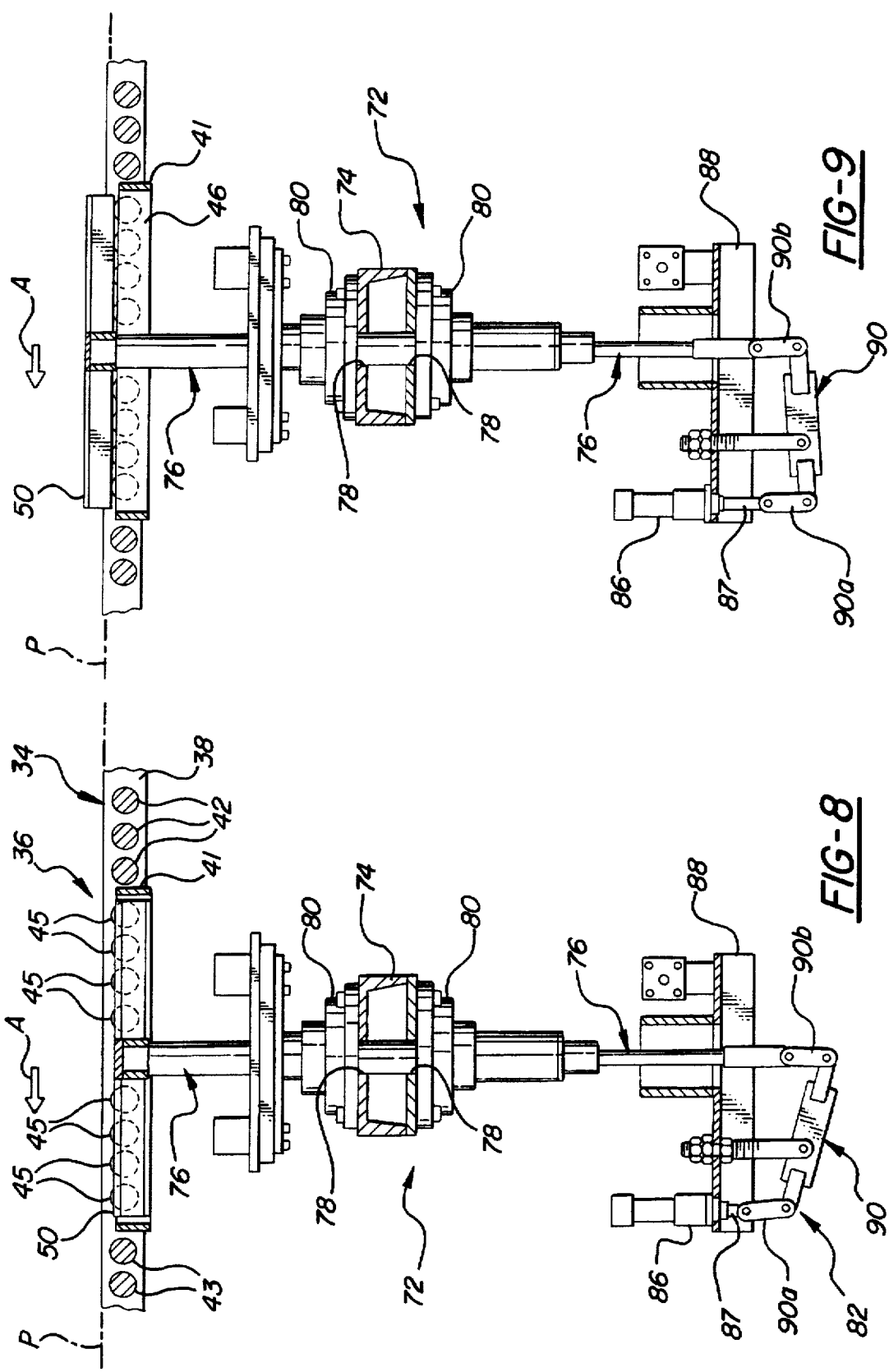

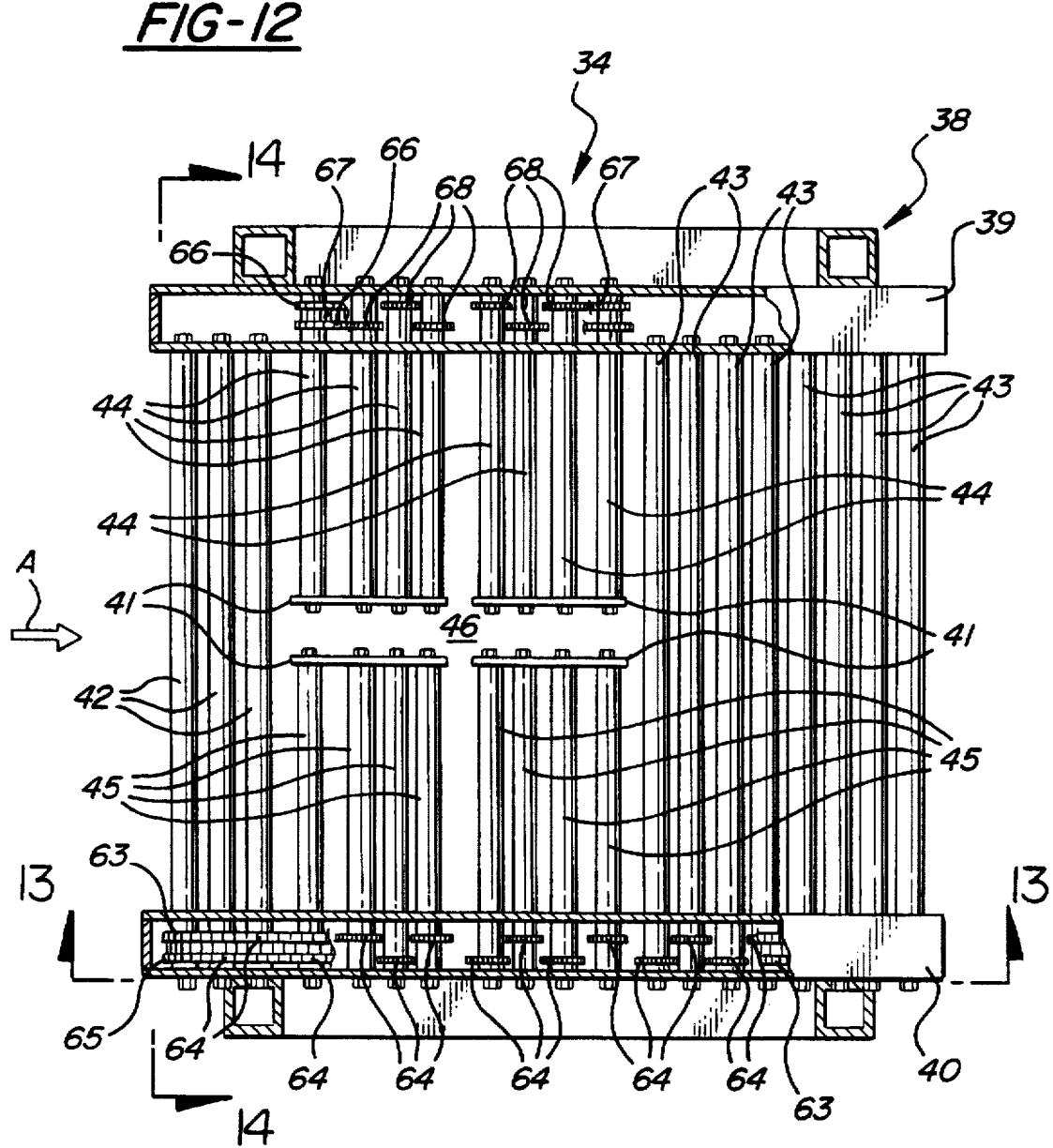

METHOD AND APPARATUS FOR PATTERNING CONCRETE BLOCKS AND PRODUCTS

This invention relates to the handling of masonry blocks in particular and more specifically to the conveyance and positioning of such blocks for assembly into multi-tiered stacks or cubes.

BACKGROUND OF THE INVENTION

It is customary for manufacturers of masonry blocks to assemble them into multi-tiered stacks or cubes for ease of handling and shipping. The blocks of each tier are often stagger-stacked in relation to the blocks in the tiers above and below to provide overlapping structural support in the stack. The staggered relation is achieved by assembling the blocks in each tier in a pattern that is different than, but which complements the pattern of, adjacent tiers.

Automated handling equipment is conventionally used to assemble the blocks in the above fashion. Typically, the blocks are conveyed along a transport line in single line, side-by-side succession to a patterning station where they are reoriented, a row- at-a-time, according to the particular tier pattern being assembled, and then are conveyed onward to a cubing station where they are off-loaded, row-by-row, by a push bar sweep onto an adjacent platform for assembly into the cube.

It is of course desirable that the cubing of the blocks be carried out as quickly and with as few steps as possible to maximize productivity and minimize cycling of the patterning and cubing station equipment.

Multi-turntable devices are often employed at the patterning station. A plurality of turntables are arranged longitudinally along a stationary conveyor bed in the direction of conveyance. The blocks arriving at the patterning station are transported by a dragbar conveyor or the like into position on the turntables, with the required number of turntable positions being provided to accommodate an entire row of the blocks at the positioning station at one time. The turntables are selectively rotated to reorient the blocks to the desired row pattern.

A similar multi-turntable station is shown in Thomas et al U.S. Pat. No. 4,205,742, wherein masonry blocks are fed in multiple single-line side-by-side rows to multiple turntables, but in the lateral rather than longitudinal direction of the turntables. FIG. 1 of the Thomas patent depicts two alternating tier patterns for use in assembling standard sized 8"×16" masonry blocks into a cube measuring 40"×48" on side.

FIG. 2 of the present application illustrates other tier patterns that are common when employing a longitudinally fed multi-turntable device at the patterning station to assemble 40"×48" cubes. It will be appreciated that the second tier pattern from the right in FIG. 2 would be difficult to assemble using the laterally fed turntable station of Thomas, unless a fourth turntable position were added. Similar difficulty arises with longitudinally fed turntable devices. Considering the patterning of the bottom-most row of the second tier pattern to the right in FIG. 2, for example, two turntable positions are required for each of the endmost blocks and two additional turntable positions are needed to handle the two intermediate block pairs of the row. To assemble such a pattern according to conventional practice, six of the side-by-side blocks are conveyed into position on their respective turntables and the middle two tables are rotated 90° to reorient the intermediate block pairs lengthwise as called for by the row pattern before the blocks are conveyed onward and off-loaded at the cubing station.

It will be appreciated that the first and second rows of blocks of the same tier pattern are required to be handled as individual rows rather than patterned together as a single row. Considering the patterning of the upper row according to conventional practice, for example, three individual side-by-side blocks are conveyed into position on each of three turntables and then rotated 90° to reorient them end-to-end for off-loading at the cubing station. The second row passes untouched through the patterning station and is off-loaded. In total, ten manipulative steps are required according to conventional practice to convey, reposition, and off-load the blocks that make up the second tier pattern of FIG. 2. The fourth and fifth tier patterns to the right of FIG. 2 require eight such steps with the middle and bottom rows, respectively, being handled separately from their adjacent rows.

Similar difficulties arise when assembling standard masonry blocks in larger 48"×48" cubes, three common tier patterns of which are illustrated in FIG. 3 of the application. It will be seen by comparison of the tier patterns of FIGS. 2 and 3 that certain block patterns are recurring, with some of the blocks extending end-to-end in a row, whereas others are arranged side-to-side. A four position turntable and twelve manipulative steps are presently required to assemble the third tier pattern of FIG. 3.

It is an object of the present invention to reduce the number of manipulative steps and turntable positions required to assemble such tier patterns.

It is a further object to achieve the above stated objectives together by prepositioning the blocks ahead of the patterning station for a more efficient operation of the patterning and cubing stations.

SUMMARY OF THE INVENTION AND ADVANTAGES

The above objects are achieved according to the invention by appreciating first of all that all or some of the rows of blocks of each tier pattern (except the base courses to the far left in FIGS. 2 and 3) can be considered as being comprised of multiple groupings of three blocks, each arranged in a so-called "tie pattern" (depicted in FIG. 4) in which two of the blocks in each group are arranged side-by-side and the third is disposed crosswisely to them at one end of the side-by-side pair. Considering, for example, the second and third tier patterns of FIG. 2, it will be seen that there are two rows of such tie-patterned groupings in each tier. The fourth and fifth tier patterns of FIG. 2 each have one row of tie-patterned blocks and one row of side-by-side blocks. The second and third tier patterns of FIG. 3 are each made up of two rows of tie-patterned blocks.

According to the invention, the blocks are preoriented into tie-patterned groupings ahead of the patterning station. The patterning station is then able to handle the blocks in such tie-patterned groupings.

The prepositioning and handling of the blocks in tie-patterned groupings has the advantage of reducing the number of turntable positions required to assemble the tier patterns. Considering, for example, the bottom-most row of the second tier pattern of FIG. 2, only two turntable positions are now required, whereas four positions are needed according to conventional practice.

Another advantage of handling the blocks in tie-patterned groupings is that the tiers are able to be assembled in far fewer steps than are required in conventional practice.

Whereas conventionally it would take ten steps to assemble the second tier pattern of FIG. 3, handling the blocks in tie-patterning groupings according to the invention reduces the number of steps to six.

According to a preferred embodiment, the prepositioning station includes a block metering device which operates to hold up the line of incoming blocks and then releases them in groups of three toward a lift and turn device at the station. The leading-most block in the group is allowed to pass by the lift and turn platform of the new device, after which the platform is elevated to lift the trailing pair of blocks above the conveyor line, rotate them 90°, and then deposit them back onto the conveyor line in the desired tie-patterned relation to the leading block for conveyance onward toward the patterning station. The process is repeated for subsequent groupings.

At the patterning station, the tie-patterning groupings are each conveyed into position on an associated turntable, and the turntables are rotated as needed to reorient the groupings in the desired row pattern called for by the particular tier being assembled. Blocks that are not to be tie-patterned are allowed to pass undisturbed through the block positioning station for handling in the conventional manner by the patterning and cubing stations.

These and other objects and features of the invention will become apparent by reference to the following specification and drawings.

THE DRAWINGS

A presently preferred embodiment of the invention is disclosed in the following description and in the accompanying drawings, wherein:

FIG. 1 is a block diagram illustration of the overall block handling system of the invention;

FIGS. 2 and 3 are diagrammatic illustrations of various tier pattern arrangements of blocks that may be employed in assembling standard masonry blocks in cubes measuring 40"×48" and 48"×48", respectively;

FIG. 5 is a schematic plan view of the block prepositioning station;

FIG. 8 is a cross-sectional view taken along line 8—8 of FIG. 7 and illustrating the platform in the lowered position;

FIG. 9 is a view like FIG. 8 but showing the platform raised to an elevated position;

FIG. 12 is a fragmentary plan view of the lift and turn conveyor system;

DETAILED DESCRIPTION

Figure 1:
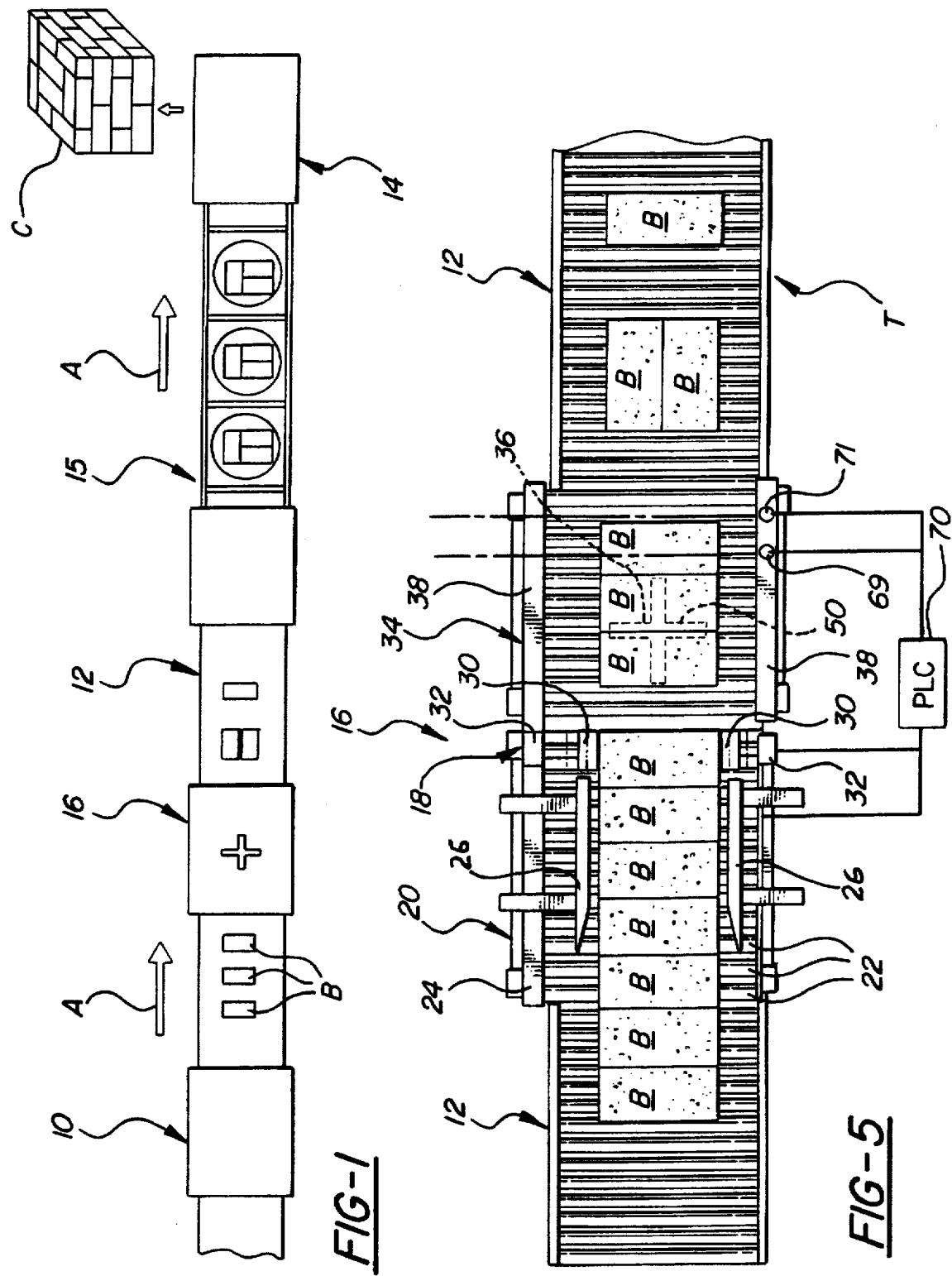

A general overview of the components and layout of a masonry block cubing line according to the invention is shown in the schematic flow diagram view of FIG. 1, wherein standard rectangular masonry blocks B, each measuring 8"×16" on side (or their rectangular equivalent) are conveyed from a production source 10 (e.g., a block turn-over and splitter station) in single line side-by-side succession in the direction of arrow A along a conveyor line 12 toward a cubing station 14 at the end of the line where the blocks B are off-loaded and assembled into multi-tiered stacks or cubes C measuring on side a multiple of the width and length dimensions of the blocks B.

Figure 2:
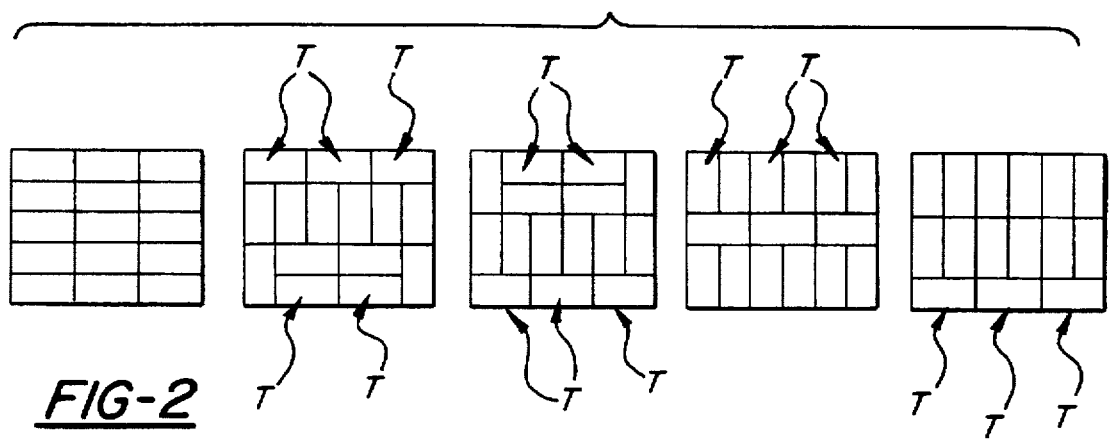
Figure 3:
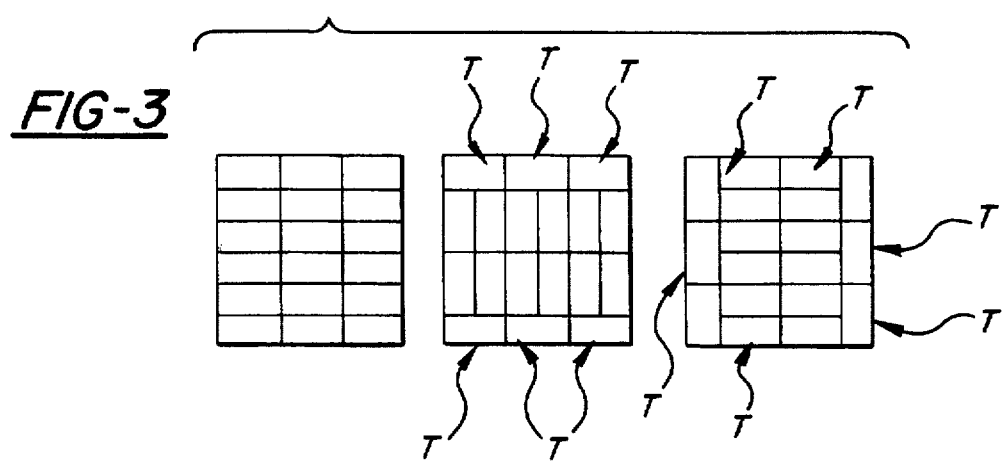
Figure 4:
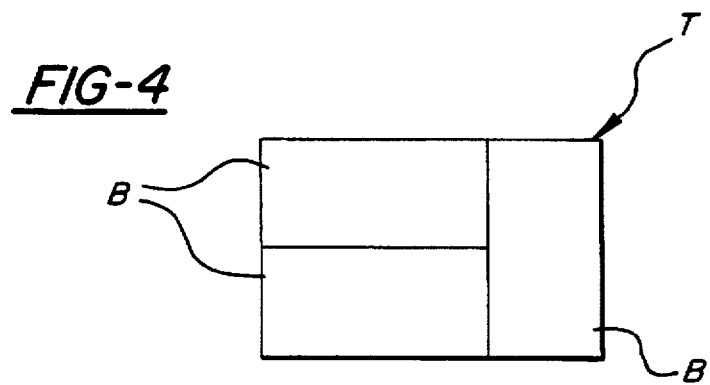
FIG. 4 is a diagrammatic illustration of a "tie-patterned" grouping of three blocks.

FIGS. 2 and 3 depict various tier patterns that may be employed for assembling such masonry blocks B into cubes C measuring 40"×48" and 48"×48" on side, respectively. It will be apparent from an inspection of FIGS. 2 and 3 that at least some of the rows of blocks (as viewed from left to right) are made up of multiple groupings T of three blocks each arranged in a so-called "tie pattern" order, as illustrated in FIG. 4, in which two of the blocks in the group are side-by-side and the third block lies cross-wise at one end of the side-by-side pair.

Up-line of the cubing station 14 is a patterning station 15, and up-line from that is a block prepositioning station 16. According to the invention, blocks to be assembled at the cubing station 14 into rows containing such tie-patterned groupings are pre-oriented at the prepositioning station into such tie-patterned groupings T upstream from patterning station 15 to achieve the desired row pattern.

Figure 6:
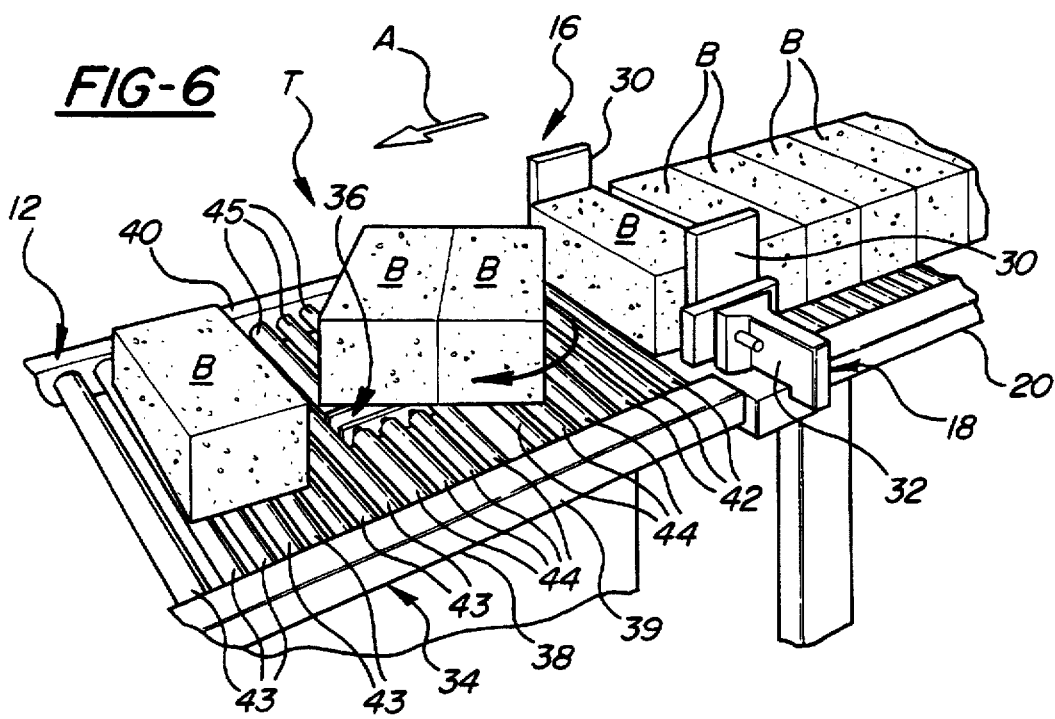
FIG. 6 is a fragmentary perspective view of the block prepositioning station.

Referring now more particularly to FIGS. 5 and 6, the line of blocks B arriving at the prepositioning station 16 in their initial side-by-side relation are received on the power infeed conveyor 20 of a block metering device 18 at the station 16. The conveyor 20 includes a series of conveyor rollers 22, journaled at their ends by a main frame 24 and coupled for conjoint driven rotation by a common drive chain and motor (not shown). Guides 26 center the block B on the rollers 22 for passage between a pair of laterally opposed block clamps 30 mounted on the frame 24 and coupled to hydraulic rams 32.

When the blocks B arriving at the prepositioning station are to be tie-patterned in accordance with the predetermined pattern of the tier in which they are to be assembled, the metering device 18 is controlled to accumulate an abutting backlog of the blocks on the conveyor, as illustrated in FIG. 5, which are then released in groups of three at a time for conveyance onward to a lift and turn device 36 provided for the station 16.

The backlog may be achieved by operating the rams 32 to displace the block clamps 30 inwardly to the solid line, block clamping position shown in FIG. 5, in order to engage with compressive force the leading block on the conveyor 20 as it arrives between the clamps 30. Clamping the leading block halts its movement and causes the blocks behind to abut and accumulate on the conveyor 20.

The grouped release of the blocks B from the metering device 18 is achieved by retracting the block clamps 30 to a block releasing position (broken chain line position in FIG. 5) out of engagement with the leading block for a time period sufficient to enable the conveyor 20 to drive the forward three blocks past the clamps, after which the clamps are returned to their block engaging position to halt the conveyance of any further blocks at this time.

Figure 7:
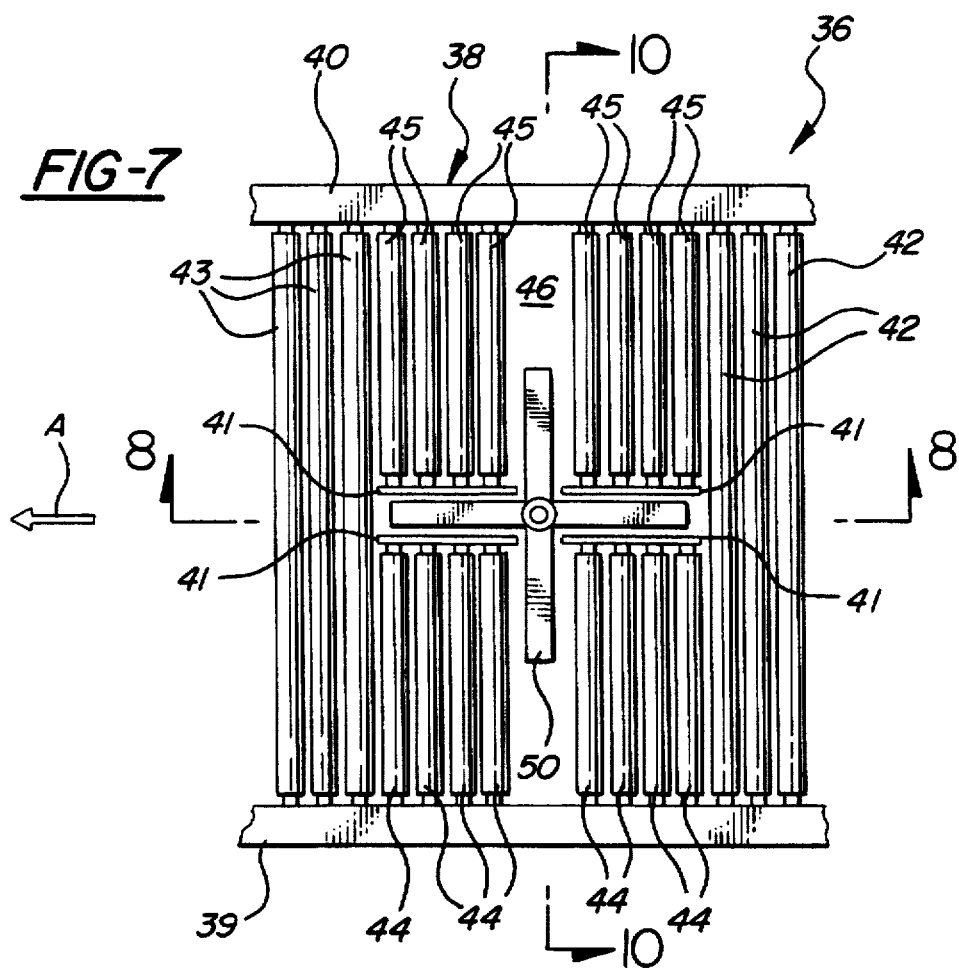
FIG. 7 is a plan view of the lift and turn device of the prepositioning station.

Blocks that are released from the metering device 18 are received on an index conveyor 34 of the lift and turn device 36 arranged immediately downline of the infeed conveyor 20. The index conveyor 34 includes a support frame 38 having longitudinal side rails 39, 40, and an intermediate frame structure 41, which journal a series of power driven rollers. As shown best in FIG. 7, a leading group 42 and trailing group 43 of rollers are transversely full length and extend continuously between the side rails 39, 40. Between the end groups of rollers 42, 43 are a group of segmented rollers which are divided into left and right hand roller sets 44, 45 (FIG. 12), journaled at their outer ends by the rails 39, 40 and at their inner ends by the intermediate frame structure 41. The rollers 44, 45 are spaced to define a cruciform-shaped opening 46 through the conveyor 34 to accommodate a similar cruciform-shaped platform 50 between the rollers, the operation and purpose of which will be described presently.

Figure 13:
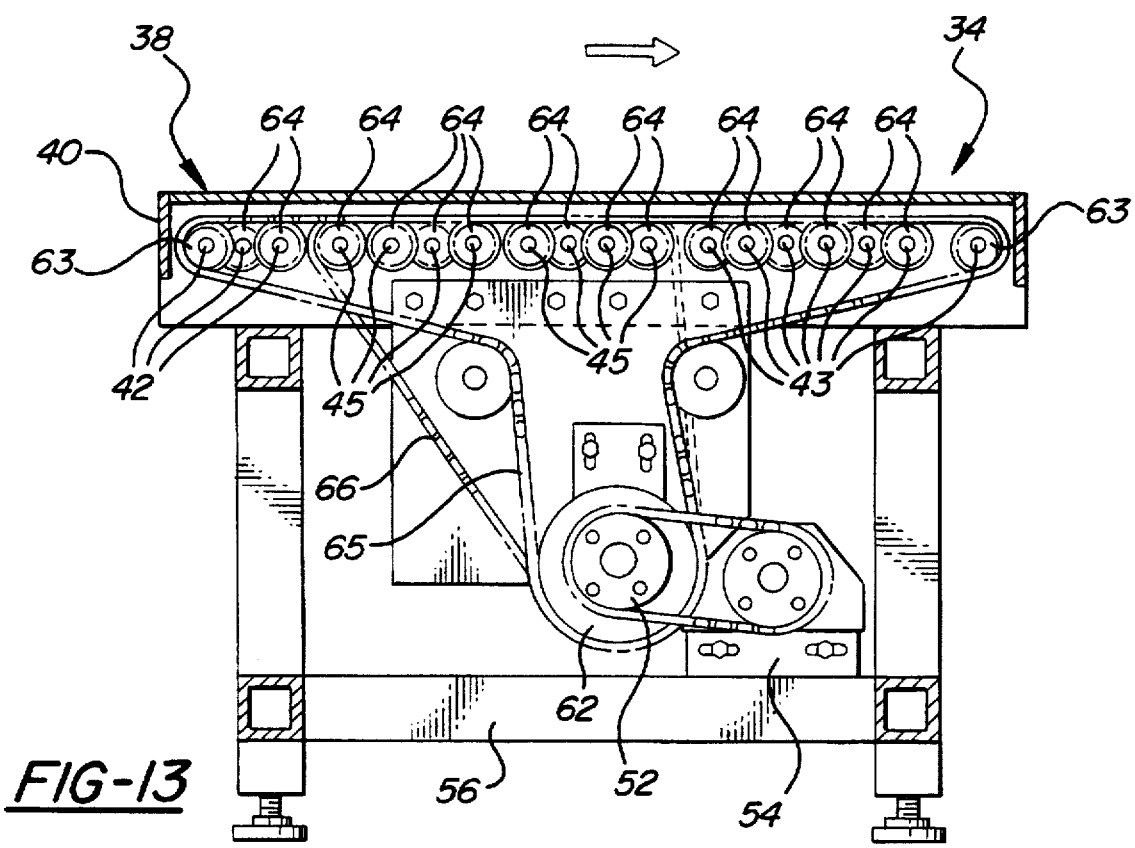
FIG. 13 is a longitudinal sectional view of the lift and turn conveyor system taken along line 13—13 of FIG. 12.
Figure 14:
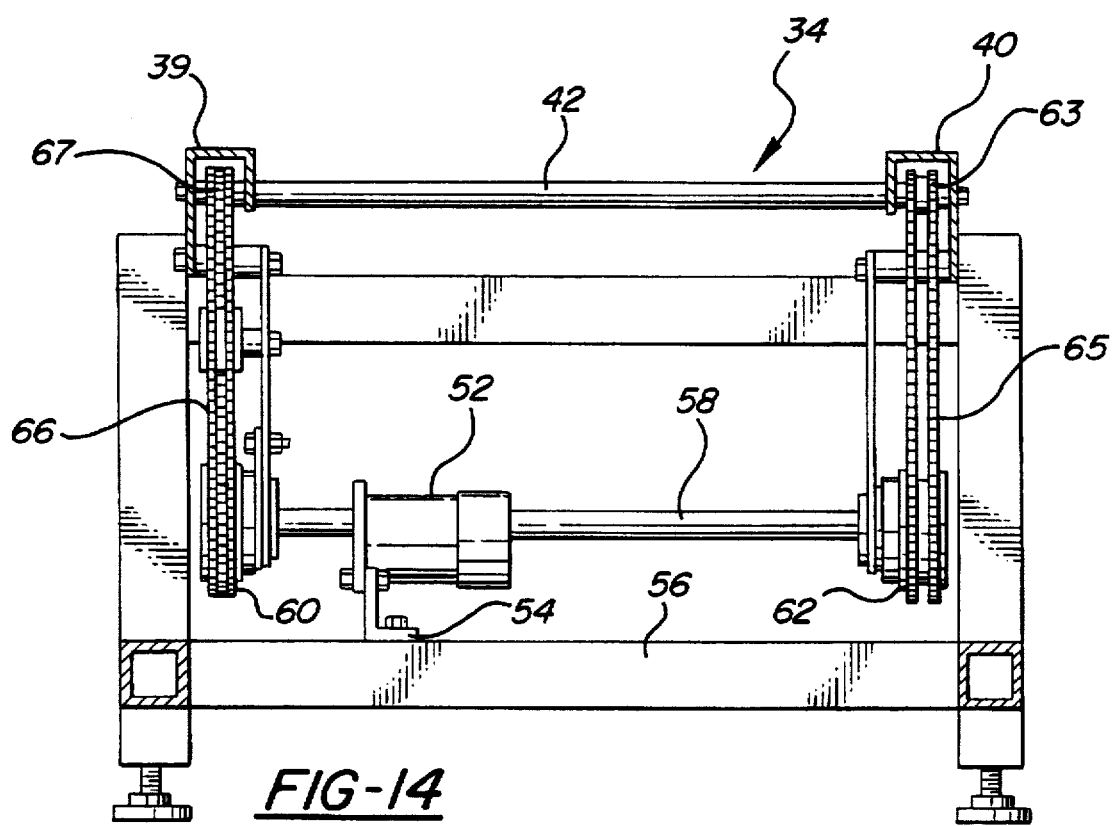
FIG. 14 is a lateral section view of the lift and turn conveyor system taken along line 14—14 of FIG. 12.

FIGS. 12–14 illustrate the drive system for the index conveyor 34. Referring to FIG. 14, a hydraulic drive motor 52 is mounted by a bracket 54 to a cross member 56 of the frame 38 beneath the rollers. A horizontal drive shaft 58 extends laterally across the conveyor from opposite sides of the motor 52 and carries dual sprocket sets 60, 62 at its opposite ends.

Referring now to FIG. 12, the leading and trailing rollers of the groups of end rollers 42, 43 carry dual sprocket sets 63 on one end thereof, and the rollers therebetween each carry a single sprocket 64. These are successively arranged in laterally staggered relation to accommodate a close spacing of the rollers and the longitudinal overlap of the sprockets 64. A continuous double wide drive chain 65 is enmeshed with the drive sprockets 62 and is trained about the dual sprocket sets 63 of the endmost groups of rollers 42, 43 as well as each of the staggered sprockets 64 of the intermediate rollers. The staggering of the sprockets 64 is such that they are caused to engage one side or the other of the double width chain 65.

It will be appreciated that the drive chain 65 is able to drive all but the intermediate set of rollers 45 on the opposite side of the conveyor. Those are driven in similar manner by a second double wide drive chain 66. As shown best in FIG. 12, the leading and trailing rollers of the intermediate roller set 45 carry dual sprocket sets 67 and the intervening rollers carry single sprockets 68 which are staggered in the same manner as sprockets 64. The chain 66 is enmeshed with dual sprockets 60 of the drive shaft 58 and then trained about the sprockets 67, 68 of the intermediate roller set 45 so that all rollers are driven conjointly upon operation of the motor 52.

Turning to FIG. 5, the group of blocks released from the metering device 18 are transported by the conveyor 34 toward the lift and turn device 36. A photo switch or other suitable position sensor 69 is located on the frame 38 in position along the conveyor to sense when the last block in the group has passed beyond the block clamps 30. The sensor 69 preferably comprises part of a larger computerized control system which includes a PLC 70 that operates in response to receiving the signal from the sensor 69 to halt the drive of the infeed rollers 22 and extend block clamps 30 to their block engaging positions to prevent any additional blocks from passing through beyond the metering station 18. The programmed controller 70 is conventional and the details of the control circuitry form no part of the present invention and need not be described.

Downline of the sensor 69 is another sensor 71 of the same or equivalent type supported by the frame 38 in position to sense when the leading block in the group has moved beyond the platform 50, which in turn corresponds to the simultaneous arrival of the trailing pair of blocks in the group into position over the platform 50. This position of the blocks is illustrated in FIG. 5. The sensor 71 signals the PLC 70 which in turn actuates a lift and turn mechanism 72 to raise the platform 50 from its initial lowered position, recessed within the opening 46 of the conveyor 34 at a level below the upper support plane P of the conveyor 34 (illustrated by chain lines in FIG. 8), to a raised position above the plane P (illustrated in FIG. 9), causing the trailing pair of blocks in the group to be engaged from below and lifted by the platform 50 off the conveyor 34. Once elevated, the platform 50, and thus the block pair, is rotated or indexed, as illustrated in FIG. 6, 90° from its initial orientation, and the platform 50 then is lowered to deposit the trailing pair of blocks back on the conveyor 34, but now repositioned in the desired tie-pattern orientation with their length dimensions now aligned with the direction of conveyance A so that they can be conveyed onward toward the patterning station 15.

The sensor 71 senses when the repositioned trailing blocks have cleared the platform 50. In response, the PLC 70 actuates the index conveyor 20 and block clamps 30 to release the next successive group of three blocks from the metering station to be tie patterned at the prepositioning station 16.

The preferred construction of the lift and turn mechanism 72 is illustrated in FIGS. 8–11. As shown best in FIGS. 10 and 11, the mechanism 72 includes a stationary mounting beam 74 that is fixed at its ends by suitable fasteners 75 or the like to laterally opposed frame sections 38a, 38b of the frame 38 in position beneath the opening 46. A vertical lift shaft assembly 76 extends through a central opening 78 in the beam 74 and is supported in vertically slidable relation thereto by means of bearing flanges 80 above and below the beam 74. The shaft 76 mounts the platform 50 at its upper end and is coupled at its lower end to a lifting mechanism 82 (FIG. 8) and a rotary index mechanism 84, both of which are under the control of the PLC 70.

As shown best in FIGS. 8 and 9, the lifting mechanism 82 comprises a hydraulic cylinder 86, mounted vertically on a horizontal swing plate 88, and having a rod 87 extending from the cylinder 86 and coupled at its free end to one leg 90a of a linkage 90 pivotally supported by the swing plate 88. The other leg 90b of the linkage 90 is coupled to the lower end of the shaft assembly 76. As illustrated in FIG. 8, retracting the rod 87 of cylinder 86 acts to rock the linkage 90 in one direction raising leg 90a and lowering leg 90b, which in turn lowers shaft assembly 76 to move the platform 50 to the lowered position. Extending the rod 87 from the cylinder 86 rocks the linkage 90 in the opposite direction to elevate the shaft assembly 76 and platform 50 to the raised position above the conveying plane P, as illustrated in FIG. 9.

Figure 11:
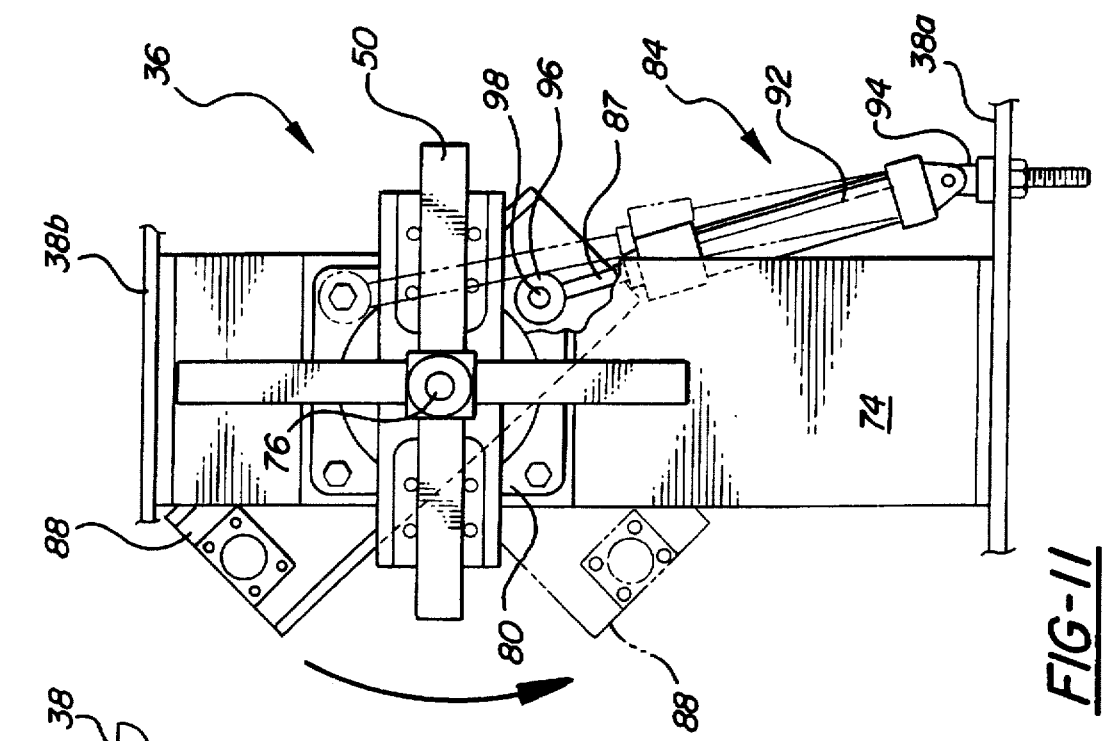
FIG. 11 is a plan view of FIG. 9 illustrating the 90° indexing of the platform between two positions.
Figure 10:
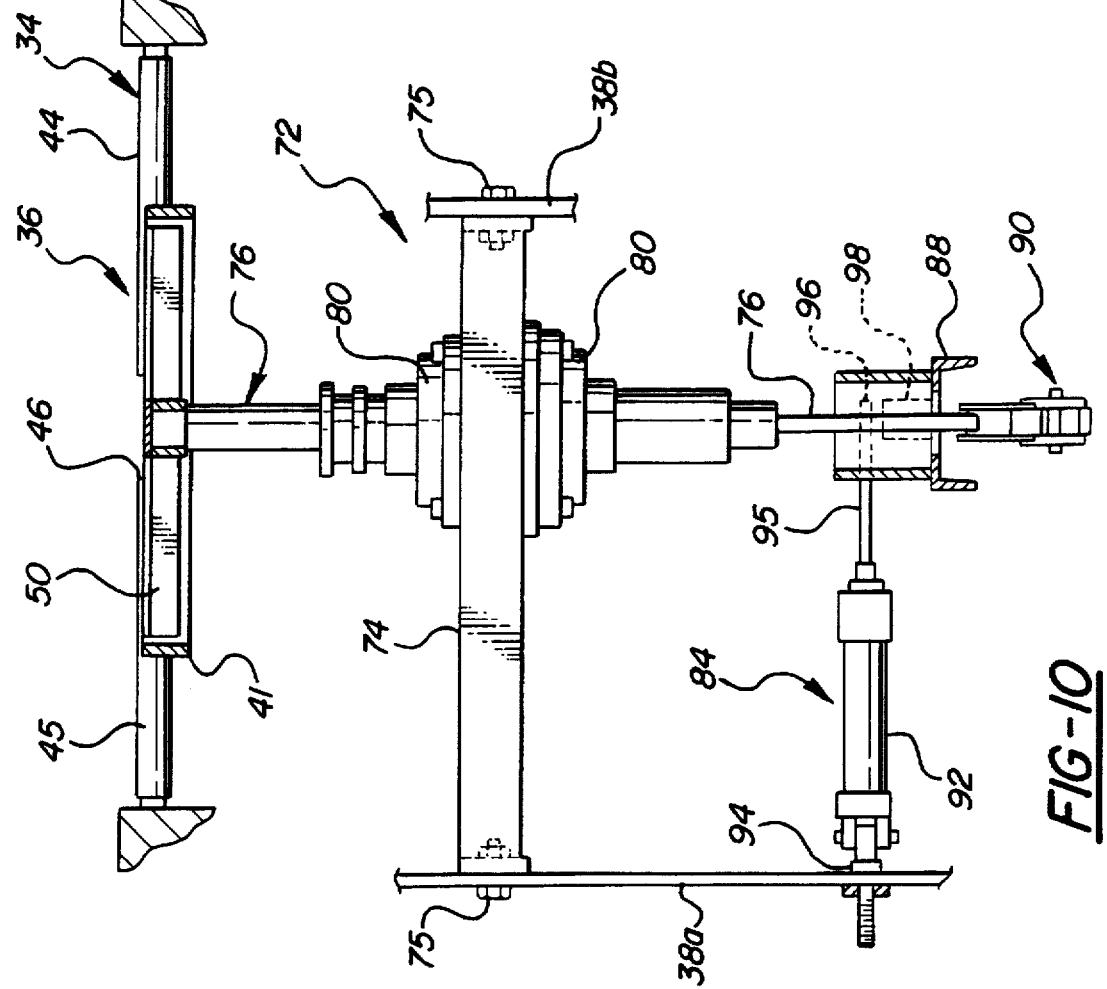
FIG. 10 is a cross-sectional view taken along line 10—10 of FIG. 7.

The construction and operation of the rotary index mechanism 84 is best illustrated in FIGS. 10 and 11. The rotary mechanism 84 includes a hydraulic cylinder 92 fitted with a threaded mounting yoke 94 at its base end for adjustable securement to the frame section 38a. A rod 95 projects from the cylinder 92 and carries a spherical coupling 96 at its free end which is attached to a lug 98 fixed to the swing plate 88 in radially spaced relation to the longitudinal rotary axis of the shaft assembly 76. Retracting the rod 95 of cylinder 92 under the control of the PLC 70 rotates the swing plate 88 and thus the shaft assembly 76 and platform 50 to the solid line position shown in FIG. 11. Extending the cylinder 92 rotates these components to the broken chain line position in FIG. 11 which is offset 90° from the solid line position. The platform 50 is retractable into the conveyor opening 46 when positioned in either of the two 90° indexed positions, enabling the platform 50 to alternate between the two positions in successive prepositioning operation cycles. It will be appreciated that the raising and lowering of the platform 50 is independent of its indexed position.

Figure 15:
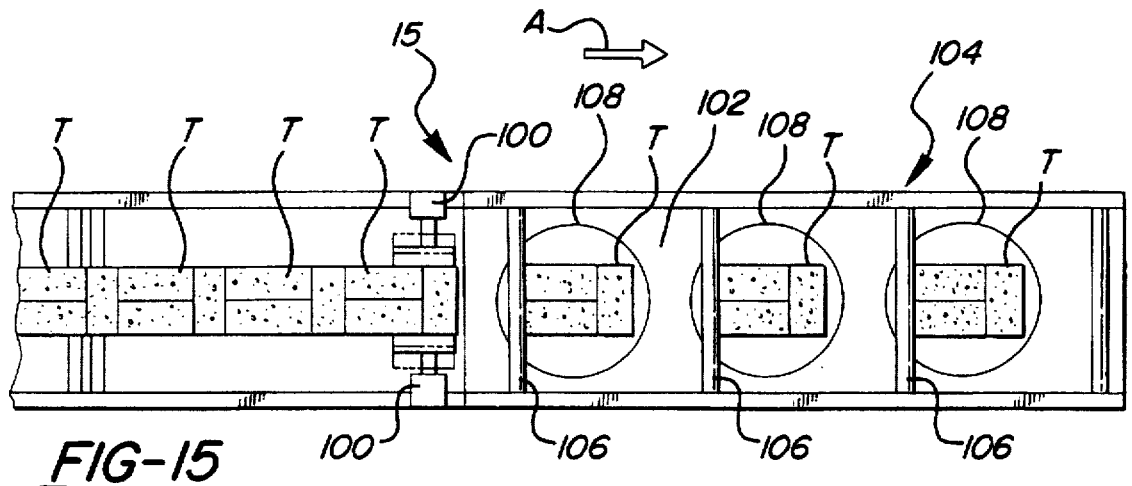
FIG. 15 is a schematic plan view showing tie-patterned groups of blocks conveyed into position on respective turntables at the patterning station.

The tie pattern groupings T arriving at the patterning station 15 are identically arranged, with the leading block in each group extending crosswisely to the direction of product flow and the pair of associated trailing blocks extending in the direction of product flow (see FIG. 15). Block clamps 100 operate to accumulate a backlog of the groupings T ahead of the patterning station 15.

Figure 16:
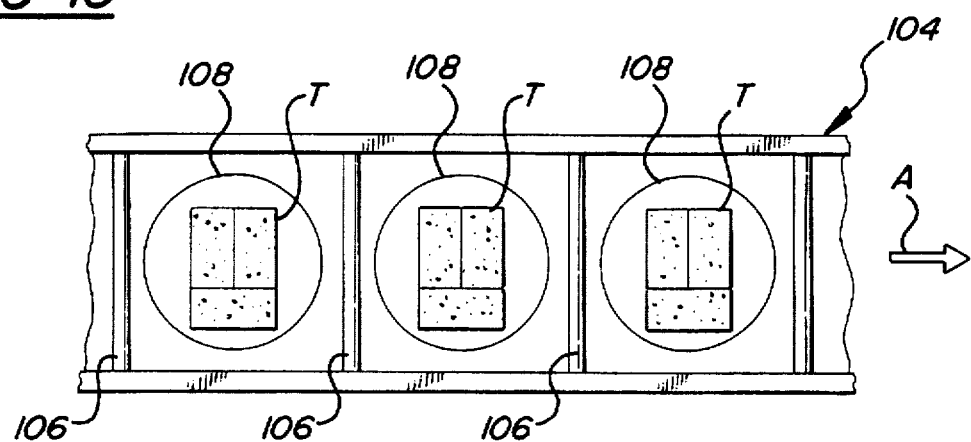
FIG. 16 is a view like FIG. 15 but illustrating the tie-patterned blocks reoriented according to a predetermined row pattern.

FIGS. 15 and 16 illustrate how the patterning station 15 may be operated to pattern, for example, the bottom row of the third tier pattern of FIG. 2. Three of such tie-patterned groupings are released by the block clamps 100 and are conveyed across a stationary bed 102 of a conventional unmodified multi-turntable patterning device 104 by means of a drag bar conveyor 106 or the like, into position on each associated turntable 108 as shown in FIG. 15. Once positioned, the bar conveyor 106 is backed up sufficiently to provide clearance for the rotation of the tier patterned groupings T as required. For the row illustrated, each turntable is rotated 90° clockwise to reorient the groupings T as shown in FIG. 16 according to the desired row pattern. The selection and degree of rotation of the turntables 108 is individually controllable and dependent on the row pattern to be developed.

Figure 17:
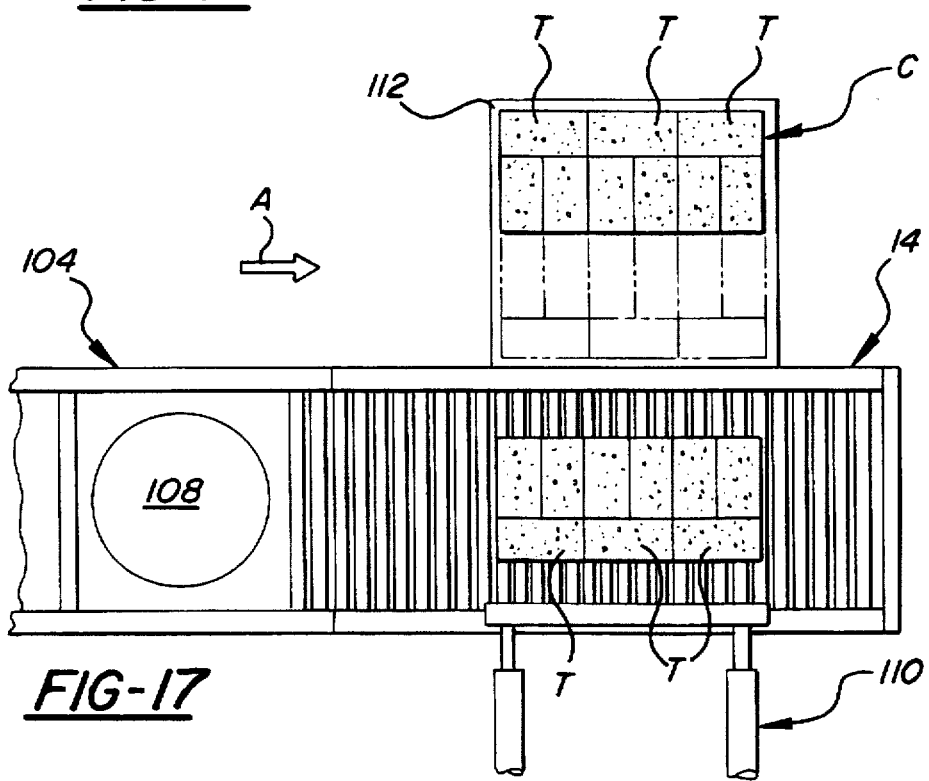
FIG. 17 is a schematic plan view of the reoriented block groups of FIG. 16 shown conveyed onward to the cubing station in preparation for off-loading onto an adjacent stack.

Once the row of tie-patterned blocks T has been properly oriented in the desired row pattern, it is conveyed onward, as illustrated in FIG. 17, to the cubing station 14 where the row may be off-loaded by means of a conventional side pusher device 110 to an adjacent assembly platform 112 for assembling the cube C.

The disclosed embodiment is representative of a presently preferred form of the invention, but is intended to be illustrative rather than definitive thereof. The invention is defined in the claims.

I claim:

1. Apparatus for handling a plurality of rectangular masonry blocks conveyed in single line side-facing-side succession toward a cubing station such that the longitudinal dimensions of the blocks are perpendicular to the direction of conveyance for assembly into a multi-tier stack at the cubing station, said apparatus comprising:

a block prepositioning station operative to receive the blocks in their initial side-facing-side relation and to separate and reposition at least selected groups of three of the blocks in a tie pattern wherein a pair of the blocks in each such group are rotated 90 degrees such that they remain in side-facing-side relation to each other but are oriented to have their longitudinal dimensions extending in the direction of conveyance perpendicular to the associated remaining block in each such group; and a patterning station arranged down line of said prepositioning station operative to receive the blocks issuing from the prepositioning station in their tie-patterned groups and to reorient the rotational positions of such groups in relation to each other in accordance with a predetermined row pattern of tier to be assembled from such blocks at the cubing station.

2. The apparatus of claim 1 wherein said prepositioning station comprises a block metering device operative to accumulate a backlog of the blocks and then release them in groups of three in timed sequence for conveyance beyond said metering device.

3. The apparatus of claim 2 wherein said block metering device includes a power roll conveyor operative to support the blocks and control their movement along said conveyor.

4. The apparatus of claim 3 wherein said block metering device includes a pair of block clamps supported on opposite sides of said conveyor for movement between a block clamping position in which said clamps compressibly engage the blocks to preclude movement thereof and a releasing position in which said block clamps are retracted out of engagement with the blocks.

5. The apparatus of claim 2 wherein said prepositioning station includes a conveyor and a lift-and-turn device arranged down line of said metering device and operative for enabling the leading block in the group released from said metering device to pass by said lift-and-turn device and for lifting the remaining pair of trailing blocks in the group off the conveyor, rotating them 90 degrees, and thereafter depositing them back on the conveyor for conveyance onward with the leading block toward said patterning station.

6. The apparatus of claim 5 wherein said lift-and-turn device includes a cruciform-shaped platform supported for movement between a lowered position at a level below the conveyor and a raised position above the conveyor, said platform being further supported for 90 degree rotation about a generally vertical axis when in said raised position; first drive mechanism connected with said platform for raising and lowering said platform, and second drive mechanism connected with said platform for indexing it 90 degrees while the platform is raised.

7. The apparatus of claim 6 wherein said conveyor comprises driven rollers oriented to define a cruciform-shaped opening between them to accommodate said platform in said lowered position, said rollers including transversely spaced rolls, and there being transversely spaced staggered sprockets connected to drive said rolls powered by a chain drive device which transversely spans said staggered sprockets.

8. The apparatus of claim 1 wherein said patterning station comprises a multi-turntable patterning device.

9. The apparatus of claim 8 wherein said patterning device includes a plurality of individually rotatable turntables each dimensioned to accommodate an associated tie patterned group of the blocks.

10. Apparatus for orienting rectangular masonry blocks traveling on a conveyor line with their longitudinal dimensions transverse to the direction of conveyance, into selected tie-patterned groupings of three blocks each in which one of the blocks in each such grouping remains crosswise to the direction of conveyance and the two other blocks in each such grouping are turned 90 degrees so that they remain in side-by-side relation but are oriented so that their longitudinal dimensions extend in the direction of conveyance, said apparatus comprising:

a block metering device operative to accumulate a backlog of the blocks and then release the blocks in groups of three for conveyance beyond said metering device; and a lift-and-turn device having a platform supported for movement between a lowered position to enable the leading block in the group of three such blocks issuing from the metering device to pass over said platform undisturbed while the trailing pair of blocks come into position over said platform, and a raised position in which the platform is elevated to lift the block pair off the conveyor line, said platform being further supported for 90 degree rotation in a generally horizontal plane to reorient the block pair in tie-patterned relation to the leading block and for subsequent retraction to said lowered position to deposit the reoriented block pair back on the conveyor line.

11. The apparatus of claim 10 wherein said block metering device includes a power roll conveyor operative to support the block and control their movement along said conveyor.

12. The apparatus of claim 11 wherein said block metering device includes a pair of block clamps supported on opposite sides of said conveyor for movement between a block clamping position in which said clamps compressibly engage the blocks to preclude movement thereof and a releasing position in which said block clamps are retracted out of engagement with the blocks.

13. The apparatus of claim 10 wherein said lift-and-turn device includes a roll conveyor having a cruciform-shaped opening therein and said platform comprises a cruciform-shaped member dimensioned for accommodation within said opening when said platform is moved to either of two 90 degree offset positions of rotation.

14. A method of manipulating a line of rectangular masonry blocks or like articles arranged in single line side-by-side succession on a conveyor line to reorient the relative positions of at least select groups of the blocks into tie patterns in which two adjacent blocks in a group of three such blocks are turned 90 degrees to the third block such that the two turned blocks remain in side-by-side relation to each other but extend lengthwise in relation to the adjacent third block in such group, said method comprising the steps of:
    feeding the blocks to a block metering device and accumulating a stationary backlog of the blocks;
    releasing a group of three of the blocks from the metering device and conveying them onward toward a lift-and-turn device arranged downline of the metering device; and
    allowing the leading block in the group to pass by said lift-and-turn device and elevating the trailing pair of blocks of the group together off the conveyor line, rotating them 90 degrees, and then depositing them back onto the conveyor line in a tie-patterned relation to the leading block and conveying them onward along the conveyor line.

15. The method of claim 14 wherein, upon releasing the group of blocks from the metering device, the blocks immediately following the released group are retained by the metering device.

16. The method of claim 14 wherein the elevation and rotation steps performed on the two trailing blocks are carried out by a lift-and-turn platform that is raised from an initial lowered position below the level of the conveyor line upwardly to engage and elevate the blocks from below above the conveyor line in a first movement, is indexed 90 degrees in a generally horizontal plane in a second movement, and is then returned to the lowered position to deposit the trailing blocks back onto the conveyor line in their reoriented positions relative to the leading block.

17. The method of claim 16 including sensing the arrival of the leading block of the group at a position beyond the lift-and-turn device corresponding to the simultaneous arrival of the trailing pair of blocks into position over the lift-and-turn platform, and in response controlling the lift-and-turn device to reposition the trailing blocks in tie-patterned relation to the leading block.

18. The method of claim 14 wherein the metering device is equipped with opposed clamp members that selectively clamp and release the blocks to control their movement through the metering device.

19. The method of claim 14 including sensing the arrival of the leading block at a position beyond the metering device corresponding in distance to that required for the last of the three blocks in the group to clear the metering device, and in response controlling the metering device to retain any further blocks from passing beyond the metering device during repositioning of the group of blocks at the lift-and-turn device.

20. A method of reorienting rectangular masonry blocks moving along a conveyor line in initial side-by-side succession with the longitudinal dimensions of the blocks arranged parallel to one another but transverse to the direction of conveyance to assemble a row of such blocks comprised of a plurality of tie patterned groupings of three blocks each in which two of the blocks of each grouping are turned 90 degrees in relation to the associated third block in said grouping and the groupings themselves are arranged in a predetermined pattern associated with said row, said method comprising the steps of:
    conveying the line of blocks that are to be assembled in said row to a prepositioning station and repositioning the line of blocks from their initial side-by-side orientation to tie-patterned groupings; and
    conveying the tie-patterned groupings to a patterning station and reorienting the groupings in accordance with the predetermined row pattern.

21. The method of claim 20 wherein the repositioning of the blocks is carried out by elevating a pair of adjacent blocks in each grouping of three off the conveyor line, rotating the block pairs 90 degrees, and then depositing them back on the conveyor line in the desired tie-patterned relation to the associated remaining block in each grouping.

22. The method of claim 20 wherein the repositioning of the blocks into said tie-patterned groupings is carried out by accumulating a backlog of the blocks at the prepositioning station and selectively releasing the blocks in said groupings of three blocks each for continued conveyance toward a lift-and-turn platform at said station, conveying the leading block in each released group past the platform and the trailing pair of blocks in the group to a position over the platform, raising the platform to engage the block pair from beneath and elevate the blocks off the conveyor line, rotating the platform 90 degrees while in the raised position to reorient the block pair 90 degrees, and thereafter lowering the platform to deposit the reoriented block pair back on the conveyor line in tie-patterned relation with the leading block in the group.

23. The method of claim 22 wherein said patterning station is equipped with a multi-turntable patterning device and said groupings are oriented in said predetermined row pattern by conveying each grouping into position on a respective turntable of said patterning device, and thereafter selectively rotating the turntables to orient the groupings in their proper row pattern positions.

24. A method of making a system for handling rectangular masonry blocks proceeding on a conveyor on which the blocks initially travel broadside to the direction of travel to a patterning station which rotates the rotational position of some of the blocks, comprising the steps of:

a. mounting a block metering device at said conveyor operative to accumulate a backlog of the blocks and then release the blocks in groups of three for conveyance beyond said metering device;

b. downstream from said block metering device and upstream from said patterning station mounting a lift-and-turn device having a platform supported for movement between a lowered position to enable the leading block in the group of three such blocks issuing from the metering device to pass over said platform undisturbed while the trailing pair of blocks come into position over said platform, and a raised position in which the platform is elevated to lift the block pair off the conveyor, said platform being further supported for 90 degree rotation in a generally horizontal plane to reorient the pair in tie-patterned relation to the leading block and for subsequent retraction to said lowered position to deposit the reoriented block pair back on the conveyor.

* * * * *